US009909462B2

(12) United States Patent
Polonsky

(10) Patent No.: US 9,909,462 B2
(45) Date of Patent: Mar. 6, 2018

(54) DUCT BURNER OF HRSG WITH LINER FILM COOLING

(71) Applicant: Nooter/Eriksen, Inc., Fenton, MO (US)

(72) Inventor: Vladimir S. Polonsky, Ballwin, MO (US)

(73) Assignee: NOOTER/ERIKSEN, INC., Fenton, MO (US)

( * ) Notice: Subject to any disclaimer, the term of this patent is extended or adjusted under 35 U.S.C. 154(b) by 637 days.

(21) Appl. No.: 14/048,780

(22) Filed: Oct. 8, 2013

(65) Prior Publication Data

US 2014/0099591 A1 Apr. 10, 2014

Related U.S. Application Data

(60) Provisional application No. 61/710,948, filed on Oct. 8, 2012.

(51) Int. Cl.
| | |
|---|---|
| *F01K 23/10* | (2006.01) |
| *F02C 7/228* | (2006.01) |
| *F02C 6/00* | (2006.01) |
| *F23R 3/20* | (2006.01) |
| *F22B 1/18* | (2006.01) |
| *F23D 14/10* | (2006.01) |

(Continued)

(52) U.S. Cl.
CPC ............ *F01K 23/103* (2013.01); *F02C 6/003* (2013.01); *F02C 7/228* (2013.01); *F22B 1/1815* (2013.01); *F23D 14/10* (2013.01); *F23D 14/70* (2013.01); *F23D 14/76* (2013.01); *F23D 14/78* (2013.01); *F23R 3/20* (2013.01); *F23D 2900/21003* (2013.01); *Y02E 20/16* (2013.01)

(58) Field of Classification Search
CPC ........ F22B 1/1815; F23D 14/10; F23D 14/70; F23D 14/76; F23D 14/78; Y02B 30/28; F23R 3/18; F23R 3/20; F02C 6/003; F02C 7/228; F01K 23/103; Y02E 20/16
USPC .................................. 60/39.5, 739; 432/222
See application file for complete search history.

(56) References Cited

U.S. PATENT DOCUMENTS

| | | | | |
|---|---|---|---|---|
| 3,178,161 | A | * | 4/1965 | Yeo ......................... F23D 14/34 431/349 |
| 3,405,921 | A | * | 10/1968 | Rohrs ..................... F23D 14/10 432/222 |

(Continued)

*Primary Examiner* — Steven B McAllister
*Assistant Examiner* — Steven Anderson, II
(74) *Attorney, Agent, or Firm* — Polster Lieder Woodruff & Lucchesi, L.C.

(57) ABSTRACT

A duct burner assembly for a HRSG having a casing that defines a combustion chamber with a liner for communicating an exhaust gas. A firing runner attaches to the liner and extends through the combustion chamber. The firing runner defines a plurality of orifices for emitting combustible gas and sustaining a flame. A flame stabilizer attaches to the firing runner and is configured to at least partially shield the plurality of orifices from the exhaust gas. A guide plate attaches to the firing runner and is configured to define a slot between the liner and the guide plate. The guide plate has an upstream end and a downstream end wherein the downstream end is closer to the lining than the upstream end to control turbulent flow of the exhaust gas through the slot and cool the liner. To reduce generation of flow turbulence the tubes within the slot are covered with streamline plates. It allows to decrease a mixing between hot and cold gas flows and improve the liner cooling.

19 Claims, 5 Drawing Sheets

(51) Int. Cl.
*F23D 14/70* (2006.01)
*F23D 14/76* (2006.01)
*F23D 14/78* (2006.01)

(56) References Cited

U.S. PATENT DOCUMENTS

| | | | | |
|---|---|---|---|---|
| 4,664,620 | A * | 5/1987 | Kendall | F23D 14/16 126/92 AC |
| 4,737,100 | A * | 4/1988 | Schnell | F23D 14/20 239/288 |
| 4,929,541 | A * | 5/1990 | Potter | F24H 3/0488 431/351 |
| 5,083,918 | A * | 1/1992 | Potter | F24H 3/0488 431/350 |
| 5,461,853 | A * | 10/1995 | Vetterick | F02C 6/18 122/7 B |
| 6,019,070 | A * | 2/2000 | Duffy | F22B 1/1815 122/209.1 |
| 6,468,073 | B1 * | 10/2002 | Weidman | F23D 14/20 431/350 |
| 6,526,964 | B1 * | 3/2003 | Potter | F23D 14/70 126/110 B |
| 2005/0014103 | A1 * | 1/2005 | Perry | F23D 14/64 431/352 |
| 2006/0272334 | A1 * | 12/2006 | Pranda | F01K 23/103 60/783 |
| 2007/0044475 | A1 * | 3/2007 | Leser | F22B 1/1815 60/772 |

* cited by examiner

# DUCT BURNER OF HRSG WITH LINER FILM COOLING

CROSS-REFERENCE TO RELATED APPLICATIONS

This Non-Provisional application claims priority to U.S. Provisional Application Ser. No. 61/710,948 filed Oct. 8, 2012, and which is incorporated herein by reference.

STATEMENT REGARDING FEDERALLY SPONSORED RESEARCH

Not Applicable.

BACKGROUND

This invention relates to heat recovery steam generators (HRSG), and more particular to a duct burner assembly for a liner of a HRSG.

Natural gas and to a lesser extent fuel oil are the sources of much of the electrical energy consumed today. Combined cycle power plants convert those fuels into electrical energy in a highly efficient manner. There are three major components in a combined cycle power plant: a combustion turbine with electrical generator, a Heat Recovery Steam Generator, and a steam turbine with electrical generator. Basically, the fuel, whether it is natural gas or oil, burns within the combustion turbine, and the turbine drives an electrical generator that produces some of the electrical energy furnished by the plant. The combustion turbine also discharges exhaust gas at elevated temperatures often exceeding 1000° F. The exhaust gas flows through the HRSG which extracts heat from it to convert subcooled water into superheated steam that flows into the steam turbine, which in turn drives another electrical generator that produces more electricity.

Duct burners use supplementary firing to increase the heat energy of a gas turbine's exhaust, making it possible to increase the output of a downstream heat-recovery steam generator. Using a HRSG with auxiliary or supplemental fuel firing in a duct burner can increase steam production, control steam superheat temperature, or meet process steam requirements. HRSG designs can also directly incorporate selective catalytic reduction (SCR) technology for nitrous oxide control.

A common problem for duct burners with heavy supplemental firing is overheating and deterioration of the liners of a combustion chamber. Thus, reliable control of the liner temperature regime is very important to prevent deterioration. This is especially true for the modern generation of combustion turbines and liquid fuels, such as oil or kerosene.

Duct burners include burner sections that produce high flame temperatures including significant thermal radiation. Duct liners are used to confine and protect ceramic fiber insulation behind the liners and the HRSG outer casing. In some cases, liners are unable to withstand the elevated temperatures over extended periods of operation. The liners fail, and when they do, the ducting that they are designed to protect is damaged.

The turbine exhaust gas approaching the burner in the ducting of a HRSG, while being at an elevated temperature, is considerably cooler than the flames produced at the burner. Turbine exhaust flowing along the liners in the combustion chamber is not heated directly by the fuel combustion. As liners absorb radiant energy from the flames, they are cooled convectively by the adjacent turbine exhaust. The amount of flow along the liner and the degree of mixing of this flow with the bulk flow heated by the flame will affect the convective heat transfer from the liner.

In existing duct burners, there are no special elements which could properly form a cold or cooler gas flow over the liners. Moreover, the burner pipe and guide tube in the gap between the duct burner framework and liner generate turbulence. Additionally, some elements of the duct burner, such as flame stabilizers and gas baffles, generate strong turbulence in the gas flow. These elements together with turbulent turbine exhaust flow destroy the protective cold film over the liners. As a result, the turbulent flow decreases the heat transfer coefficient from the liner to the coolant and can increase the temperature of the liner in the vicinity of the flame. A less turbulent flow would increase the heat transfer coefficient from the liner to the coolant and lower the temperature of the liner.

Therefore, there is a need for effective cooling of the liner of a HRSG duct burner with less turbulence of turbine exhaust flow.

DESCRIPTION OF THE DRAWINGS

In the accompanying drawings which form part of the specification.

Corresponding reference numerals indicate corresponding parts throughout the several figures of the drawings.

DETAILED DESCRIPTION

Figure 1:
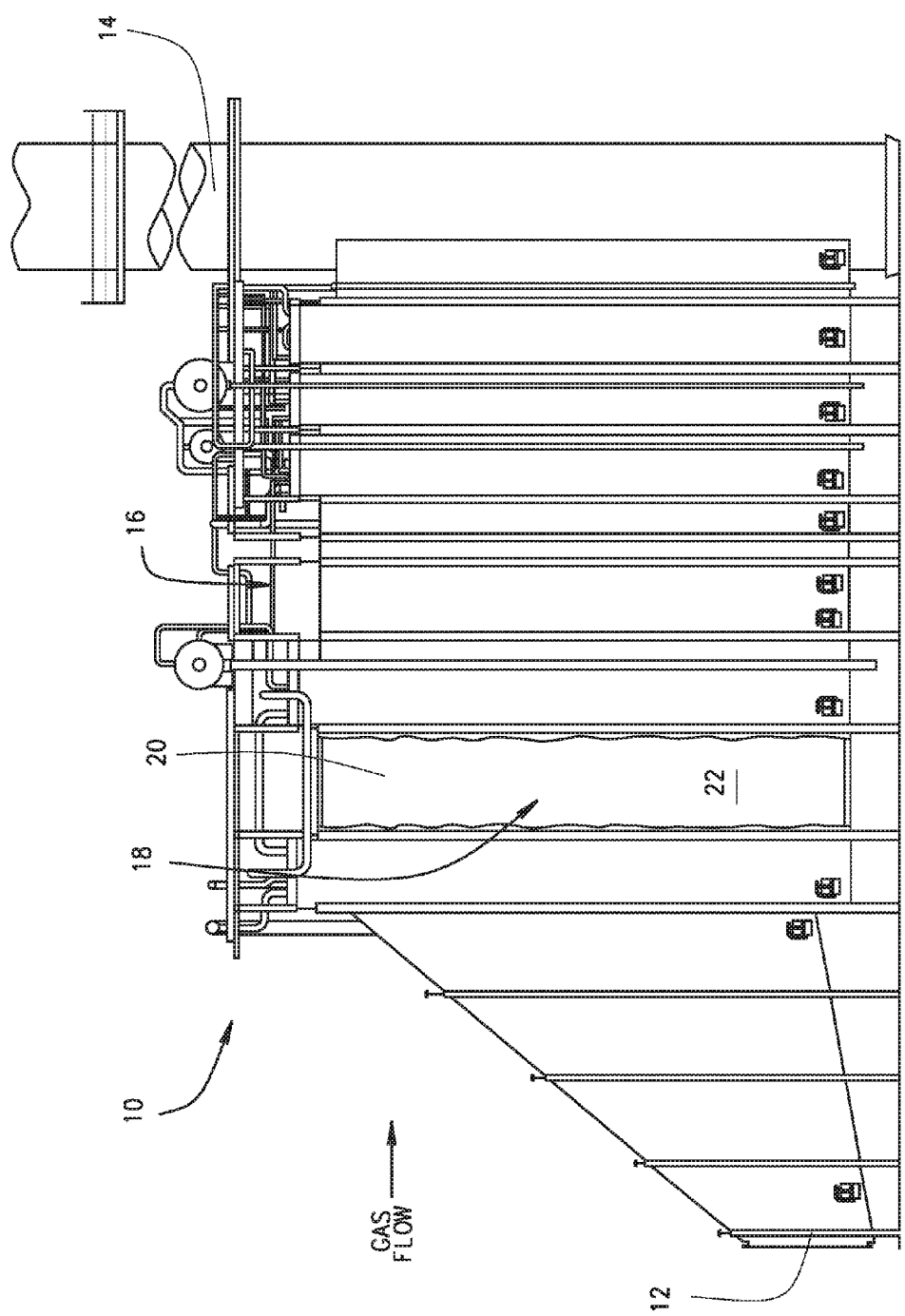
FIG. 1 is a partial section view of a heat recovery steam generator (HRSG), illustrating the location of the duct burner sub-assembly.

The following detailed description illustrates the claimed invention by way of example and not by way of limitation. The description clearly enables one skilled in the art to make and use the disclosure, describes several embodiments, adaptations, variations, alternatives, and uses of the disclosure, including what is presently believed to be the best mode of carrying out the claimed invention. Additionally, it is to be understood that the disclosure is not limited in its application to the details of construction and the arrangements of components set forth in the following description or illustrated in the drawings. The disclosure is capable of other embodiments and of being practiced or being carried out in various ways. Also, it is to be understood that the phraseology and terminology used herein is for the purpose of description and should not be regarded as limiting.

As shown in FIGS. 1-5, an embodiment constructed in accordance with the present disclosure, generally referred to as a Heat Recovery Steam Generator 10 having an inlet 12 for receiving a gas turbine exhaust, an outlet 14, and a casing 16 configured for housing a duct burner assembly 18 configured for providing cooling to the liner sidewalls 20. As known in the prior art, Heat Recovery Steam Generators such as with which the present invention is used, can include a superheater, at least one evaporator located downstream in the exhaust path from the superheater, and a feedwater heater, such as depicted by numerals 16, 18 and 20, respectively, in U.S. Pat. No. 6,508,206. Such Heat Recovery Steam Generators can also include an economizer, and steam drums flow connection with an evaporator, such as designated economizer 16 and steam drum 42 in U.S. Pat. No. 6,557,500.

The duct burner assembly 18 defines a generally rectangular prism shaped combustion chamber 22 configured for combustion of fuel with oxygen from a gas turbine exhaust (FIG. 1). The liner sidewalls 20 are configured within the combustion chamber 22 to withstand gas temperatures that exceed the allowable temperature of the liner material, such as about 1700° to about 3000° F.

Figure 2:
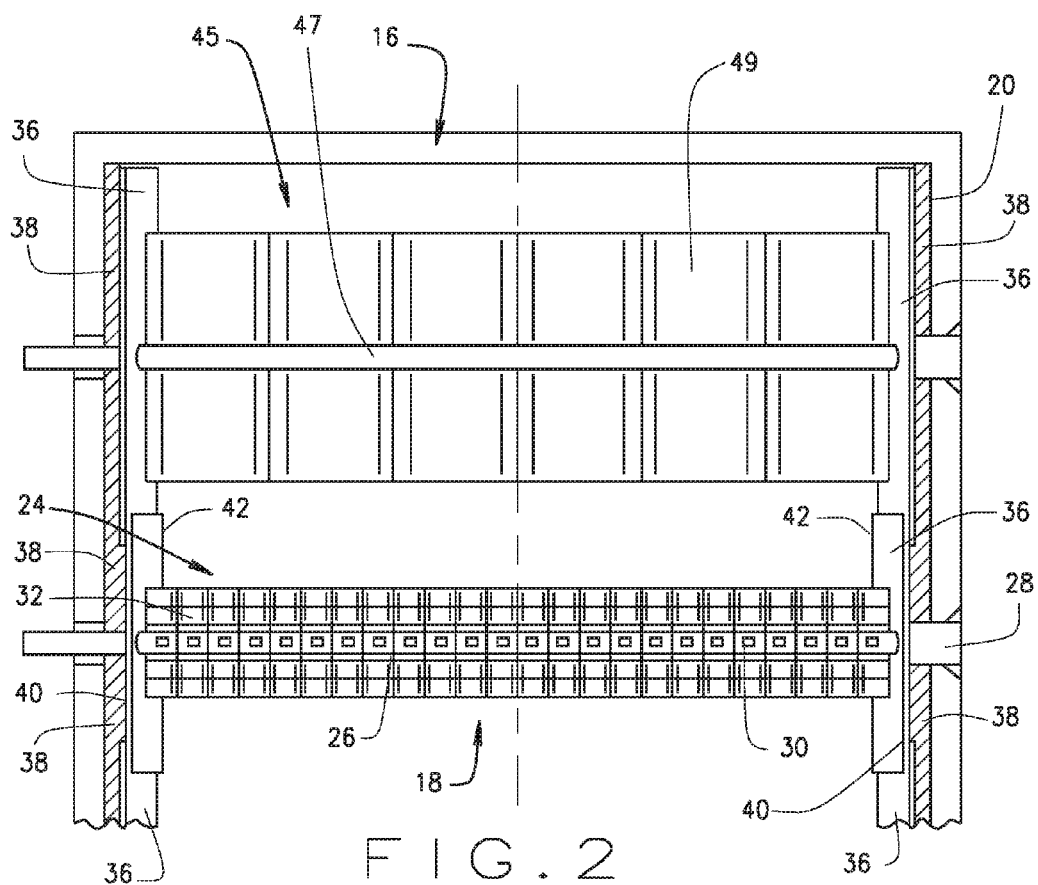
FIG. 2 is a front view of a duct burner assembly.
Figure 3:
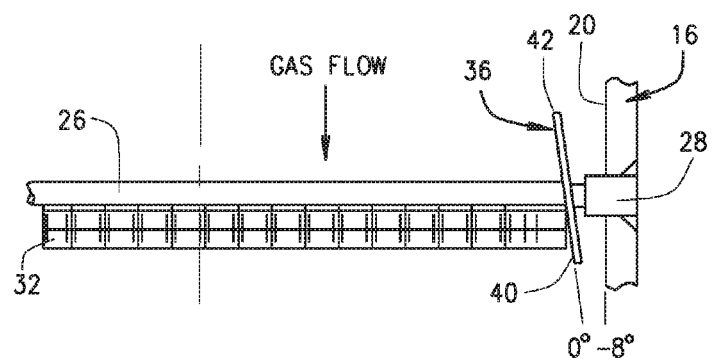
FIG. 3 is a top view of the duct burner assembly.

The duct burner assembly 18 includes a plurality of gas-fired sections 24 and gas blocking runner sections 45 within the casing 16 (FIG. 2-3). Each section 24 includes a firing runner pipe 26 that extends transversely through the chamber 22 with each end of the running pipe 26 secured by runner guide tubes 28. The firing runner pipe 26 defines a plurality of orifices 30 that open and point generally in the direction of the turbine exhaust flow. The orifices 30 are configured for discharge of a combustible gas, such as natural gas, propane, or other suitable fuels.

Figure 4:
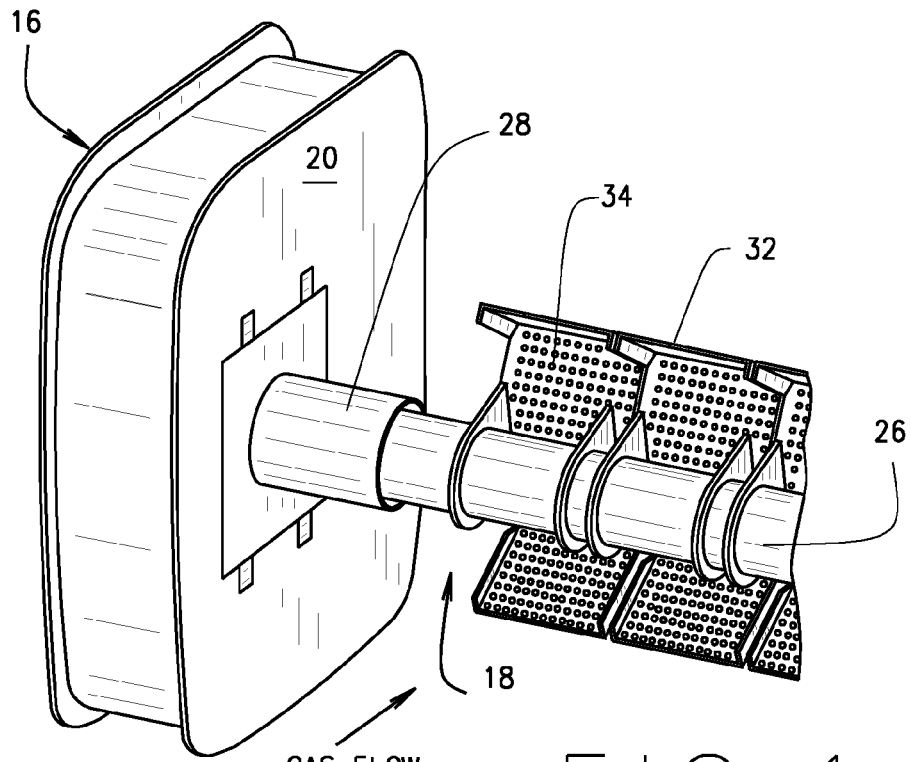
FIG. 4 is a perspective view of a firing runner pipe, firing runner guide tube mount, flame stabilizer 32, and their association with a housing casing and casing liner side wall, all of which are known in the prior art as shown in FIG. 4.

A flame stabilizer 32 attaches to the firing runner pipe 26, such as by welding or fasteners, and is configured to at least partially shield the combustible gas discharged from the orifices 30 from the turbine exhaust flow. In the embodiment of FIGS. 1-5, the flame stabilizer 32 is a specially configured panel, such as generally M-shaped, W-shaped, or other shape according to the design of the burner manufacturer, that extends generally the height of the runner pipe 26 and is positioned on the downstream side of the runner pipe 26 to define a space therebetween for burning flames. The flame stabilizer 32 defines a plurality of openings 34. When the combustible gas is ignited, the flame stabilizer 32 allows a flame to be sustained generally along the runner pipe 26. Accordingly, flames produced by each burner section 24 provide supplemental heat for increasing the steam production in the HRSG. The firing runner pipe 26, firing runner guide tubes 28, flame stabilizer 32, and their association with the casing 16 and casing liner side wall 20, all as shown in FIG. 4, are part of the prior art just as shown in FIG. 4. Further, gas blocking runner section or baffles, such as illustrated as 45 in FIG. 2, are known in the prior art, and are known in the prior art to be located in the exhaust gas air flow generally in the same plane as the firing runner pipe 26, and flame stabilizer 32, shown in FIG. 4. The gas blocking runner section 45 comprises a baffle runner pipe 47 to which a baffle plate 49 is mounted, as is well known in the art.

Figure 5:
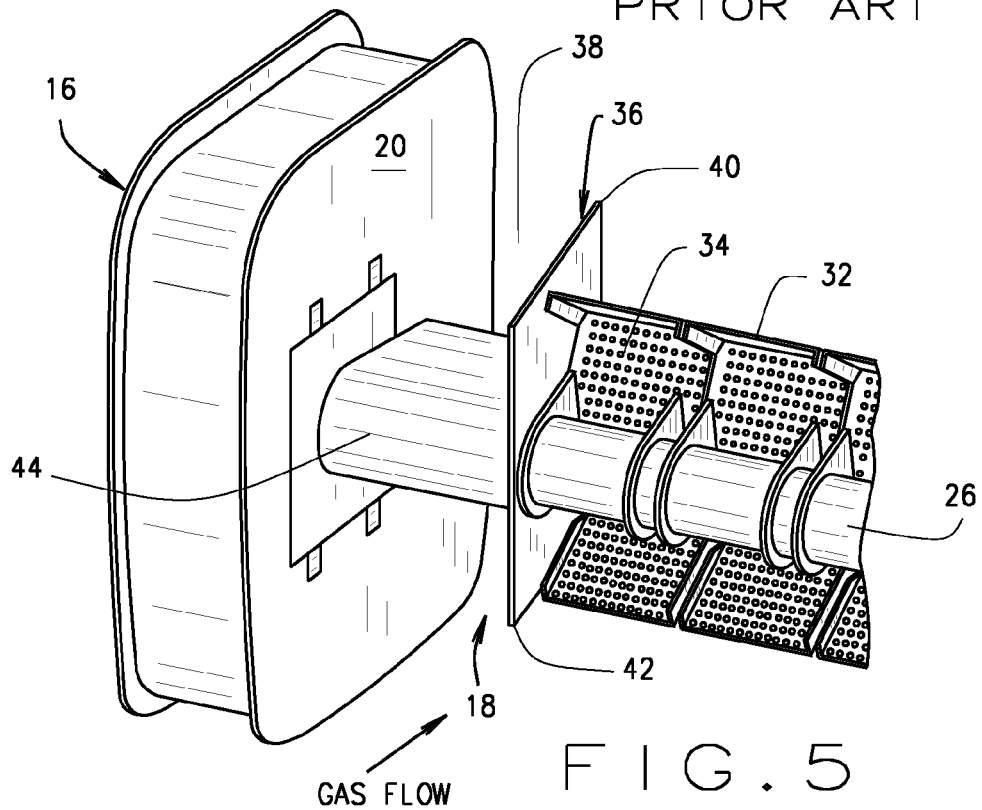
FIG. 5 is a perspective view of an embodiment of the invention including a guide plate for directing flow of exhaust gas between the casing sidewall and guide plate, and a streamline body fitting about the end of a guide tube or end of a firing runner pipe, all in combination with a firing runner pipe, firing runner guide tube mount, flame stabilizer 32, with casing sidewall.
Figure 6:
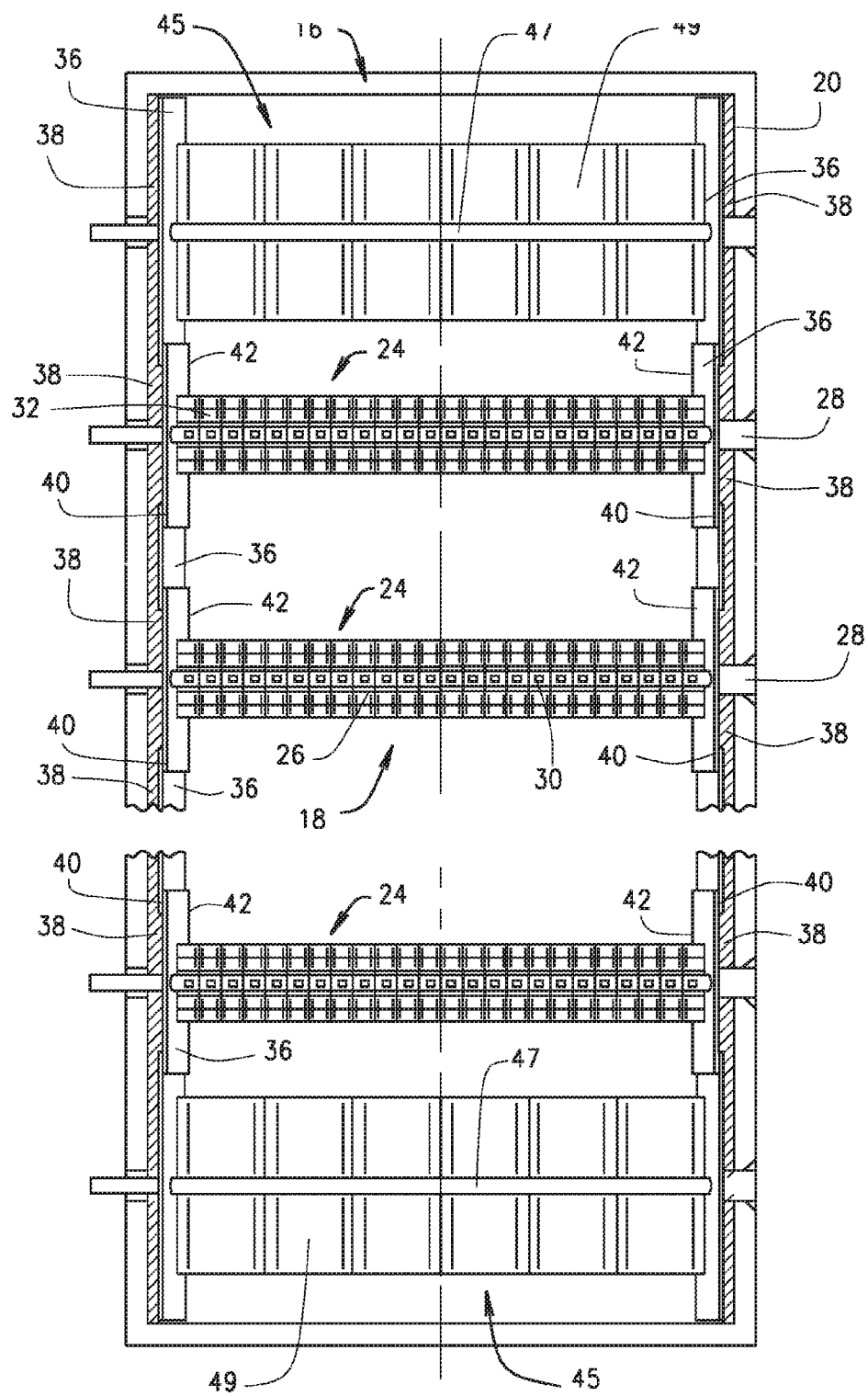
FIG. 6 is a front view of multiple duct burner assemblies.
Figure 7:
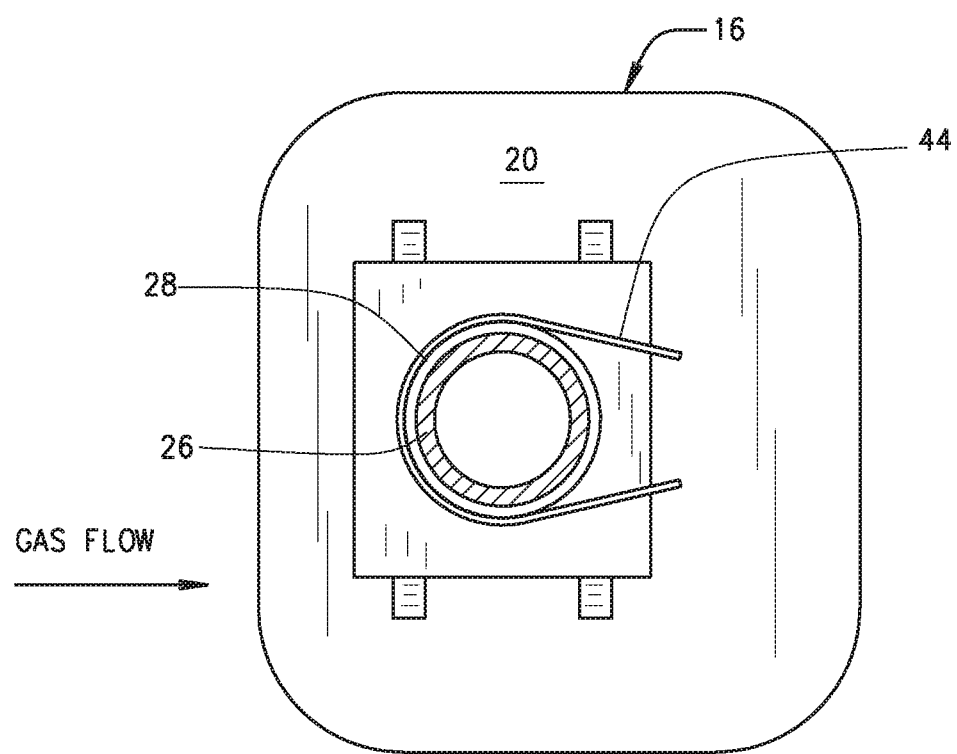
FIG. 7 is a section view showing a streamlined plate curved around a guide tube and runner pipe.

A guide plate 36 is a generally square or rectangular plate that attaches near each end of the runner pipe 26, such as by welding or other suitable method (FIGS. 3-5). Alternatively, the guide plate 36 can attach to guide tubes 28. The guide plate 36 is in a generally vertical position with an inner face of the guide plate 36 abutting the end of the flame stabilizer 32 and spaced a predetermined distance from the liner sidewall 20 to define a slot 38. The guide plate 36 is positioned at an angle relative to the liner sidewall 20 with the downstream end 40 of the guide plate 36 positioned closer to the liner sidewall 20 than the upstream end 42. In other words, the slot 38 is widest at the upstream end 42 and narrowest at the downstream end 40. Preferably, the angle between the liner sidewall 20 and the guide plate 36 is between a range of about 0° and about 8° (FIG. 3). The length of guide plates 36 in the direction of exhaust flow are preferably about three times the width of the slot 38 at the downstream end 40. The configuration of the guide plates 36 stabilizes jets and enhances cooling of the liner sidewalls by increasing the colder turbine exhaust flow over the liner sidewalls 20 and decreasing turbulent mixing. This increases cooling of the liner sidewalls 20 and separates the flow by the liner sidewall 20 from contact with hot gas flow.

Additional guide plates 36 are installed along the liner sidewall 20 in the vertical spaces between the gas blocking runner sections 45 and their adjacent firing runner 26, as well as between firing sections 24 and their adjacent firing runners 26, to form a generally continuous slot 38 between the liner sidewall 20 and the guide plates 36. Preferably, the guide plates 36 that are not mounted to a firing runner 26 or a baffle runner pipe or baffle plate 49, are configured vertically to slightly overlap with adjacent guide plates 36, and mounted to adjacent guide plates 36, such as by bolts extending through slots in guide plates 36 and held by nuts, so that the physical detachment and overlap accommodates thermal expansion of the guide plates 36. Thus, in the region of the gas fired sections 24, slots 38 exist along the entire vertical expanse of the sidewall liners 20.

Streamlined bodies, such as streamlined plates 44 are attached to the ends of the runner pipes 26 and guide tubes 28 to improve the aerodynamic performance by reducing turbulence of the turbine exhaust and preventing generation of vortexes and separation of flow. Each streamline plate 44 is specially shaped to generally cover all pipes and guide tubes in slot 38. The streamlined plates 44 are positioned in a generally horizontal orientation or inclined orientation to follow the direction of flame. Those skilled in the art will recognize that the size and shape of the streamlined plate can vary to accommodate different geometries of pipes and guide tubes 28.

The duct burner assembly 18 is preferably made from a metal material, such as alloy, steel, or composite material. However any material can be used that is capable of withstanding the elevated temperatures produced by the flames.

Changes can be made in the above constructions without departing from the scope of the disclosure, it is intended that all matter contained in the above description or shown in the accompanying drawings shall be interpreted as illustrative and not in a limiting sense. For example, while the duct burner assembly 18 of FIGS. 1-5 are for use with the liner sidewalls, the assembly 18 can also be used with the top and bottom liners as well. Although, the duct burner assembly 18 of FIGS. 1-5 is used in a HRSG, the duct burner assembly 18 can be used in other types of burners or boilers.

What is claimed is:
1. A heat recovery steam generator comprising:
a housing having an inlet configured for receiving hot exhaust gas from a gas turbine and an outlet configured for discharging exhaust gas;
the housing comprising a casing comprising walls and a combustion chamber formed within the casing walls, and comprising the casing walls having liners positioned interior to the walls, the casing walls and liners configured to be capable of allowing the exhaust gas to flow through the housing from the housing's inlet to its outlet;

a plurality of duct burner sub-assemblies mounted with the casing wall liners, each duct burner sub-assembly comprising:
(a) a firing runner extending within the combustion chamber, the firing runner defining a plurality of orifices for emitting combustible gas and sustaining a flame, the firing runner extending between the liners and mounted to be supported by the casing walls;
(b) a flame stabilizer attached to the firing runner and configured to at least partially shield the plurality of orifices from the exhaust gas; and
(c) a plurality of guide plates mounted relative to the firing runner, the guide plates configured and positioned within the casing to define a slot between one of said casing wall liners and a corresponding guide plate, each guide plate having an upstream end and a downstream end, with the downstream end being closer to the liner than the upstream end; the plurality of guide plates positioned along each liner to define a slot between said liner and its corresponding plurality of guide plates, its corresponding plurality of guide plates being configured to be aligned adjacent to each other and partially overlap one another.

2. The duct burner assembly of claim 1 further comprising the firing runners being mounted by guide tubes that secure the firing runner to the liner.

3. The duct burner assembly of claim 1, wherein the flame stabilizer is configured to extend generally the height of the firing runner.

4. The duct burner assembly of claim 1, wherein the guide plates are at an angle of between 0° to about 8° relative to the liner.

5. The duct burner assembly of claim 1, wherein the length of the guide plates are at least about three times the width of the slot at the downstream end.

6. The duct burner assembly of claim 2, further comprising a streamlined body mounted to be located within each slot and configured to cover a guide tube.

7. The duct burner assembly of claim 1, further comprising a streamlined body having an upstream end and extending in a downstream direction therefrom, with a rounded edge at its upstream end and located within each slot.

8. The duct burner assembly of claim 2, wherein each said guide plate is supported by a corresponding firing runner.

9. The duct burner assembly of claim 1, further comprising a blocking gas baffle positioned within the casing wall generally in vertical alignment with the firing runners, flame stabilizers and guide plates.

10. The heater recovery steam generator according to claim 1 wherein the flame stabilizer has a rear end, and the guide plate has an inner face that abuts the rear end of the flame stabilizer.

11. A heat recovery steam generator comprising:
a housing having an inlet configured for receiving hot exhaust gas from a gas turbine and an outlet configured for discharging exhaust gas;
the housing comprising a casing comprising walls and a combustion chamber formed within the casing walls, and comprising the casing walls having liners positioned interior to the walls, the casing walls and liners configured to be capable of allowing the exhaust gas to flow through the housing from the housing's inlet to its outlet;
a plurality of duct burner sub-assemblies mounted with the casing wall liners, each duct burner sub-assembly comprising:
(a) a firing runner mounted relative to wall liners to extend within the combustion chamber, the firing runner defining a plurality of orifices for emitting combustible gas and sustaining a flame;
(b) a flame stabilizer attached to the firing runner and configured to at least partially shield the plurality of orifices from the exhaust gas;
(c) a plurality of a guide plate mounted relative to the firing runner, the guide plate configured and positioned within the casing to define a slot between one of said casing wall liners and a corresponding guide plate, each guide plate having an upstream end and a downstream end, with the downstream end being closer to the liner than the upstream end, the guide plate being at angle of between 2° to 8° relative to the liner; the plurality of guide plates positioned along each liner to define a slot between said liner and its corresponding plurality of guide plates, its corresponding plurality of guide plates being configured to be aligned adjacent to each other and partially overlap one another; and
(d) a streamlined body member configured to cover a section of the firing runner positioned within the slot.

12. The heat recovery steam generator according to claim 11 wherein the length of the guide plate is at least about three times the width of the slot at the downstream end.

13. The heat recovery steam generator according to claim 11, further comprising the mounting of the firing runner comprising guide tubes that secure the firing runner to the liners.

14. The heat recovery steam generator according to claim 11 wherein the flame stabilizer comprises a panel that extends generally the height of the firing runner.

15. The heat recovery steam generator according to claim 13, further comprising the said streamlined body configured to cover at least one of the guide tubes located within the slot.

16. The heat recovery steam generator according to claim 13 wherein the guide plate is mounted to a guide tube.

17. The heat recovery steam generator according to claim 11 wherein the guide plate is mounted to the firing runner.

18. The heater recovery steam generator according to claim 17 wherein the flame stabilizer has a rear end, and the guide plate has an inner face that abuts the rear end of the flame stabilizer.

19. The duct burner assembly of claim 11 further comprising a blocking gas baffle positioned within the casing wall generally in vertical alignment with the firing runners, flame stabilizers and guide plates.

* * * * *